US009166650B2

(12) United States Patent
Wilson et al.

(10) Patent No.: US 9,166,650 B2
(45) Date of Patent: Oct. 20, 2015

(54) CAPACITIVE-COUPLED CROSSTALK CANCELLATION

(75) Inventors: John Michael Wilson, Raleigh, NC (US); Lei Luo, Durham, NC (US)

(73) Assignee: Rambus Inc., Sunnyvale, CA (US)

( * ) Notice: Subject to any disclaimer, the term of this patent is extended or adjusted under 35 U.S.C. 154(b) by 938 days.

(21) Appl. No.: 12/993,843

(22) PCT Filed: Jun. 9, 2009

(86) PCT No.: PCT/US2009/046763
§ 371 (c)(1),
(2), (4) Date: Nov. 21, 2010

(87) PCT Pub. No.: WO2010/002553
PCT Pub. Date: Jan. 7, 2010

(65) Prior Publication Data
US 2011/0069782 A1    Mar. 24, 2011

Related U.S. Application Data

(60) Provisional application No. 61/077,774, filed on Jul. 2, 2008.

(51) Int. Cl.
*H04B 3/32* (2006.01)
*H04L 25/02* (2006.01)

(52) U.S. Cl.
CPC ............... *H04B 3/32* (2013.01); *H04L 25/026* (2013.01)

(58) Field of Classification Search
CPC .............. H04B 1/38; H04B 1/40; H04B 1/50; H04B 1/52; H04B 1/54; H04B 1/58; H04B 3/00; H04B 3/02; H04B 3/03; H04B 3/32; H04L 25/026; H04L 25/0264

USPC ........ 375/219–221, 257, 258; 327/52, 54, 55; 330/252, 253, 260, 291, 292, 295; 333/24 R, 204
See application file for complete search history.

(56) References Cited

U.S. PATENT DOCUMENTS 5,864,506 A    1/1999    Arcoleo et al. .......... 365/189.05
6,160,790 A    12/2000    Bremer ......................... 310/201
(Continued)

FOREIGN PATENT DOCUMENTS

CN    101132194 A    2/2008
JP    62123838    6/1987    .............. H04M 9/02
(Continued)

OTHER PUBLICATIONS

JP Office Action dated Jul. 31, 2012 in JP Application No. 2011-516413. 3 pages.
(Continued)

*Primary Examiner* — Young T Tse
(74) *Attorney, Agent, or Firm* — Marc P. Schuyler

(57) ABSTRACT

This disclosure presents a method of canceling inductance-dominated crosstalk using a capacitive coupling circuit; it also presents a method of calibrating, selecting and programming a capacitance value used for coupling, so as to add a derivative of each aggressor signal to each victim signal, and thereby negate crosstalk that would otherwise be seen by a given receiver. In the context of a multiple-line bus, cross-coupling circuits may be used between each pair of "nearest neighbors," with values calibrated and used for each particular transmitter-receiver pair. Embodiments are also presented which address crosstalk induced between lines that are not nearest neighbors, such as, for example, for use in a differential signaling system.

37 Claims, 7 Drawing Sheets

(56) References Cited

U.S. PATENT DOCUMENTS

| | | |
|---|---|---|
| 7,269,212 B1 | 9/2007 | Chau .................. 375/229 |
| 2002/0075968 A1 | 6/2002 | Zerbe et al. |
| 2003/0099190 A1 | 5/2003 | Zerbe |
| 2004/0022311 A1 | 2/2004 | Zerbe et al. |
| 2005/0259692 A1 | 11/2005 | Zerbe |
| 2006/0099926 A1 | 5/2006 | Broyde et al. |
| 2006/0116086 A1* | 6/2006 | Kuzmenka .................. 455/103 |
| 2006/0136153 A1 | 6/2006 | Liaw et al. |
| 2006/0215769 A1* | 9/2006 | Haridass et al. .............. 375/257 |
| 2008/0024331 A1* | 1/2008 | Jang .................. 341/51 |
| 2009/0067482 A1* | 3/2009 | Zerbe et al. .................. 375/229 |
| 2009/0245008 A1* | 10/2009 | VanStee et al. ............... 365/227 |
| 2010/0309964 A1* | 12/2010 | Oh et al. ..................... 375/219 |

FOREIGN PATENT DOCUMENTS

| | | | |
|---|---|---|---|
| WO | WO2004/114576 | 12/2004 | |
| WO | WO 2010-002553 | 1/2010 | .............. H04B 3/32 |

OTHER PUBLICATIONS

International Preliminary Report with mail date of Jan. 13, 2011 re Int'l. Application PCT/US2009/046763 includes Written Opinion. 7 Pages.

Johnson, Howard Dr., "Mitigating Crosstalk." High-Speed Digital Design-online Newsletter—vol. 6, Issue 1. Jan. 20, 2003. pp. 1-3.

EP Examination Report dated Feb. 9, 2015 in EP Application No. 09774005.4. 3 pages.

* cited by examiner

CAPACITIVE-COUPLED CROSSTALK CANCELLATION

BACKGROUND

In systems that have multiple communication lines disposed in close proximity, signaling on any one of the lines may excite shadow signals on the other lines, a phenomenon known as "crosstalk." Crosstalk tends to reduce signaling margin on the lines (i.e., the tolerable timing and/or amplitude error in a transmitted signal on those lines) and thus generally becomes increasingly problematic as signaling rates increase and amplitudes shrink, ultimately limiting signaling bandwidth.

A number of approaches have been developed for addressing crosstalk; however, these approaches may or may not work or be desirable in every given situation. A need therefore still exists for approaches to addressing the crosstalk problem.

The present invention addresses this need and provides further, related advantages.

BRIEF DESCRIPTION OF THE DRAWINGS

In FIG. 4, each driver (such as driver 417) is coupled to its two nearest neighbors by a capacitive-coupling circuit, exemplified by numeral pairs 427/428 or 429/430, respectively. Lines at the edge of the bus (such as a first line 409) only have one nearest neighbor, and are coupled only to one nearest neighbor line by a single capacitive coupling circuit (exemplified by numeral pair 425/426).

DETAILED DESCRIPTION

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application to certain methods and devices. The description set out below exemplifies (i) a transmitter that utilizes a capacitance circuit to capacitively couple a representation of a signal used to drive one signal path onto another (parallel) signal path, and a system based on such a circuit, and (ii) method of operation in a transmission system that includes setting a capacitive coupling circuit in response to a calibration value; more particularly, each of this transmitter and method of operation may be used in the embodiments discussed below to negate crosstalk using capacitive coupling. While these specific examples are presented, the principles described herein may also be applied to other methods and devices as well.

I. Introduction

This disclosure relates to a signaling system in which a transmitter sends signals to a receiver. Generally speaking, signals transmitted between these devices on a data line have a tendency to create shadow signals or "crosstalk" on other nearby lines which can degrade the quality of signals on those other lines; in fact, crosstalk is often mutual, meaning that if the lines are spaced close enough together, crosstalk can interfere with the ability to interpret signals on many of or all of the lines.

Embodiments disclosed herein utilize capacitive coupling to reduce crosstalk including, for example, by deliberately placing cancellation signals on "neighbor" paths that will have the effect of negating crosstalk as experienced by the receiver. Crosstalk can be created, reduced or exacerbated by a variety of conditions associated with signaling components, signal path length, the way paths are routed between components, temperature, manufacturing variations, environmental variations and other factors; this disclosure therefore also provides principles for addressing this variability through calibration of particular signal paths and conditions, so as to gauge the amount of capacitive coupling (and, if desired, the timing of applying the coupling) that ought to be provided given the layout at issue. Taken together, these principles provide a low cost, high efficiency solution to the crosstalk problem, especially useful in signaling environments dominated by inductive crosstalk.

Figure 1:
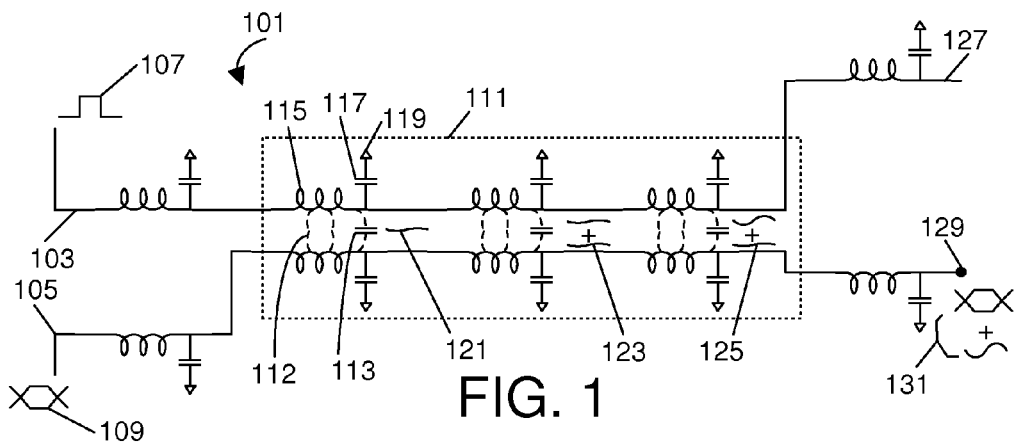
FIG. 1 is used to explain the problem of far-end crosstalk on a transmission line. In this example, a first line 103 is an "aggressor" line and generates crosstalk (represented by sine wave symbols 121, 123 and 125) onto a second, "victim" line 105. The victim line 105 runs in parallel for at least part of its length with the aggressor line 103; the resultant "interchannel interference" ("ICI") contributed by the crosstalk is illustrated by a superposition of two signals, denoted by reference numeral 131 at the right side of FIG. 1.

FIG. 1 is used to illustrate a signaling system 101. A set of communication paths, or a "bus," is typically used to route communications between various electronic components (not seen in FIG. 1). The bus can include any type of communication paths or lines, including parallel or serial links, data transmission lines or control or address lines, clock or other special purpose signals. For example, the bus can be configured for, without limitation, single-ended, differential, encoded, multi-level or other form of communications, and may be used for bi-directional or uni-directional signaling. The bus may be dedicated to communication between two electronic components (i.e., one or more point-to-point signaling links coupled between two electronic components) or may be a shared resource used to enable communication between more than two electronic components (e.g., one or more multi-drop signaling links coupled between three or more electronic components). As mentioned earlier, as digital electronics continue to shrink in size and signal paths are routed closely together, the crosstalk problem increases. FIG. 1 is used to illustrate this problem using just two lines, 103 and 105. In this example, it is desired to transmit a first digital waveform 107 over the first line 103 and a second digital waveform 109 over the second line 105. The second signal will in practice typically also be a square wave pulse, but is illustrated using a "data eye" symbol (i.e., a data valid interval) to indicate transitions are not instantaneous (i.e., exhibiting nonzero rise and fall times) and that the value of the conveyed data (i.e., a bit in the case of a binary signal or multiple bits in the case of a multi-level signal or other type of signal that conveys more than a single bit per symbol) may take any state for purposes of present discussion. In this example, the two signals lines are assumed to be disposed parallel to one another along at least a portion of their length, in close relation, such that crosstalk arises. The region of parallel travel is denoted in FIG. 1 by a dashed-line box 111, and crosstalk that arises should be assumed to take the form of inductive crosstalk 112 as well as capacitive crosstalk 113.

Inductive crosstalk and capacitive crosstalk will be present in any type of signal lines, with inductive crosstalk and capacitive crosstalk generally having opposite polarity. ICI can arise whenever either type of crosstalk becomes more significant than the other. For certain types of printed circuit board and other routing commonly used for computer manufacture, inductive crosstalk tends to dominate, and the result is that the interference from forward crosstalk at the far end of a bus, away from a transmitter, is dominated by inductive coupling (which is opposite in polarity to the direction of transitions of the aggressor signal).

Each transmission line may be modeled as a series of units, with each unit including an inductor 115 and a capacitor 117 that couples the line to a reference plane or return path (such as represented by a triangular symbol 119). In many bus routing schemes, signal lines can be characterized as having somewhat consistent path dimensions and spacing between adjacent neighbor paths and thus, as indicated by FIG. 1, forward crosstalk effects are additive and build over the length of parallel routing of the two lines 103 and 105. The additive affects of this crosstalk are represented by three sine wave symbols (or summations of signals), indicated by reference numerals 121, 123 and 125.

Thus, the transmission of the first signal 107 to a far end 127 of the first transmission line 103 will induce crosstalk on the second signal line 105, which interferes with the signal 109 transmitted on that path. The result is that the second signal 109 arrives at its destination 129, but with interchannel interference, which is represented by numeral 131 and associated summation.

Far-end crosstalk that will render it difficult to interpret the second signal 129 is given mathematically in equation (1), below, by the product of the forward crosstalk coupling coefficient "$k_{fx}$," the duration in time of the coupling between lines "$t_x$," and the derivative of the aggressor signal "$dV_g/dt$".

$$FE_{XT} = (k_{fx})(t_x)\left(\frac{dV_a}{dt}\right), \quad (1)$$

$$k_{fx} = \frac{1}{2}(k_{cx} - k_{lx}), \quad (2)$$

The aggressor signal "$V_a$" represents the transmitted signal 107 in FIG. 1. The forward crosstalk coupling coefficient is given mathematically in equation (2) by "$k_{cx}$," which represents crosstalk due to capacitive-coupling, and "$k_{lx}$," which represents the crosstalk due to inductive coupling. With respect to the aggressor signal, $V_a$, far-end crosstalk, therefore, takes the form of a positive polarity signal when capacitive coupling dominates the coupled lines, a negative polarity signal when inductive coupling dominates, and is negligible or non-existent when capacitive coupling and inductive coupling balance out.

In certain types of signal lines, inductive coupling tends to dominate capacitive coupling, with the result of this dominance being a negative shadow signal seen by a receiver that builds based on signal path length, bus cross sectional geometry, temperature and other conditions. Unfortunately, as mentioned, this dominance tends to be common for many types of printed circuit board routing, including where a micro-strip bus is used. A micro-strip bus is used in many types of printed circuit board communications, and typically features a metallic reference plane, an insulator above the ground plane, and metallic communication lines atop the insulator; a micro-strip bus is easily and cheaply fabricated, but lacks the relatively greater amount of protection that shielded designs would give against certain types of signal interference, including crosstalk.

It should therefore be assumed that the first signal waveform 107 gives rise to negatives of aggressor transitions; these are symbolically depicted in FIG. 1 using reference numerals 121, 123 and 125. Because forward crosstalk is an accumulating, non-saturating, electromagnetic field effect, its effects on the second signal line 105 will become more prominent along the length of parallel travel of the two lines 103 and 105. The first transmission line 103 is in this example an "aggressor" channel, whereas the second signal or transmission line 105 is a "victim" channel in the sense that it experiences interchannel interference ("ICI") that interferes with ability to interpret data 109 sent along the second line.

Figure 2:
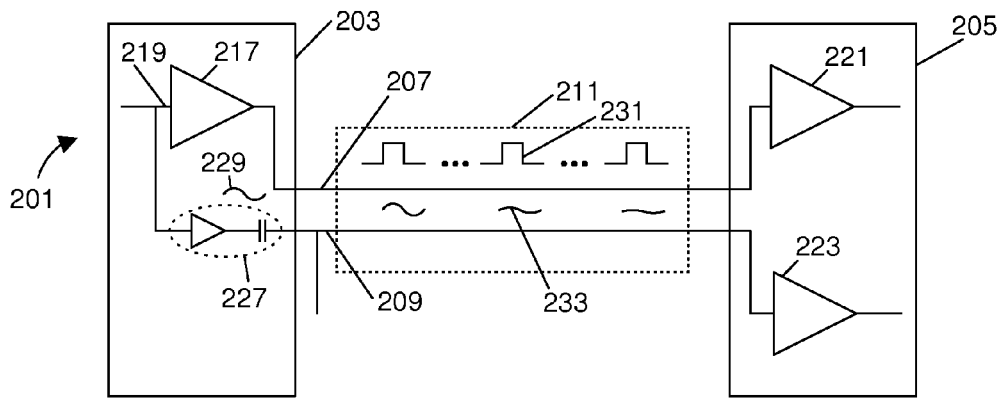
FIG. 2 is a schematic diagram of one embodiment of a communication system, namely, one that uses a capacitive coupling circuit 227 to negate the effects of far-end crosstalk. The capacitive coupling circuit couples a representation of a would-be aggressor signal 219 onto a second line 209 (i.e., the victim line), in the form of a signal derivative. Notably, the capacitance of the capacitive coupling circuit 227 and its output impedance may be defined so as to reduce far-end crosstalk as it appears at a receiver 205.

FIG. 2 shows an embodiment 201 that applies a capacitively coupled signal to negate undesired far-end crosstalk. For example, with respect to an inductance-dominated transmission path, the embodiment of FIG. 2 features deliberate injection of a capacitively-coupled signal so as to effectively balance terms in equation (2) and produce a far-end crosstalk that is approximately zero. This approach differs from some other attempts to deal with the crosstalk problem, which often attempt to prevent crosstalk from happening altogether.

FIG. 2 shows a transmitter 203 that will transmit to a receiver 205 over a first transmission line 207. This transmission line is seen to pass relatively close to a second line 209 over a common transmission path 211 and, thus, to potentially generate undesired forward crosstalk at the receiver 205. In this example, it should be assumed that the crosstalk is inductance-dominated crosstalk, such as might be found in a micro-strip line bus, and that it is desirable to negate crosstalk. A driver 217 drives an input signal 219 onto the first transmission line 207 for receipt by a first slicer 221 of the receiver; a second slicer 223 receives signals transmitted along the second line 209 (which may or may not originate with the same transmitter). As seen in FIG. 2, the transmitter utilizes a capacitive coupling circuit 227 to couple a representation of the input signal 219 onto the second line 209 so as to effectively balance the inductive and reactive (capacitive) effects of crosstalk as they would appear to the receiver. The capacitive coupling circuit 227 may be any circuitry necessary to accomplish the function of placing a complement to forward crosstalk onto the second line (potentially even including delay elements, e.g., if inductive crosstalk is not linear along the entire length of parallel transmission lines), but is symbolized in this example as including a driver and capacitor.

A sine wave symbol 229 is depicted adjacent the capacitive coupling circuit in the transmitter and represents the exact negative of the symbol used to depict aggregate forward crosstalk in FIG. 1 (i.e., the sine wave denoted in part by reference numeral 131). That is to say, as indicated above, the effects of inductive crosstalk is additive along the length of parallel transmission lines and thus builds slowly and is unique for each receiver, depending on distance from the transmitter and other factors; by adding in a "lump sum" cancellation signal (e.g., a positive derivative of the original driver signal), the embodiment of FIG. 2 effectively perturbs neighbor signals in a manner that balances out cumulative inductive crosstalk effects that will be seen at a particular receiver to attempt to drive total crosstalk (as represented by equation (1), above), to zero. The associated coupling signal will be added in any signal being transmitted on the second line 209 in a manner such that crosstalk arising from the first signal 231, which is not suppressed, incrementally cancels the coupling signal over the length of its parallel travel with the second line 209. The result is to ideally produce exactly the desired original signal at the slicer 223; that is to say, as denoted by reference numeral 233 in FIG. 2, the effects of the coupled signal are eroded by crosstalk from the first transmission line, so as to reduce or eliminate interchannel interference.

It is also possible to negate the effect of capacitive crosstalk using the principles mentioned above; since capacitive crosstalk couples a positive polarity signals onto neighbor lines, the capacitive coupling circuit would couple a complement signal (i.e., reverse polarity) onto neighbor lines in order to compensate for this form of crosstalk. In the examples that follow, discussion will focus primarily on reduction of inductance-dominated crosstalk, as this problem tends to predominate in the case of many transmission lines, including a micro-strip bus, but it is possible to apply the principles discussed herein to negate other forms of crosstalk as well.

As mentioned, the effects of crosstalk depend on a number of factors, including path routing. In situations in which a number of receivers communicate with one transmitter (e.g., a number of memory devices at different locations receive signals from a memory controller) or where a number of transmitters communicate with one receiver (e.g., a number of memory devices at different locations send signals to one controller), crosstalk may vary for each transmitter-receiver path; that is to say, capacitive coupling provided by the embodiment of FIG. 2 can be tuned (or mapped or calibrated or otherwise specifically adjusted) according to the specific transmitter-receiver configuration in order to cancel out inductance-dominated crosstalk as effectively as possible.

Figure 3:
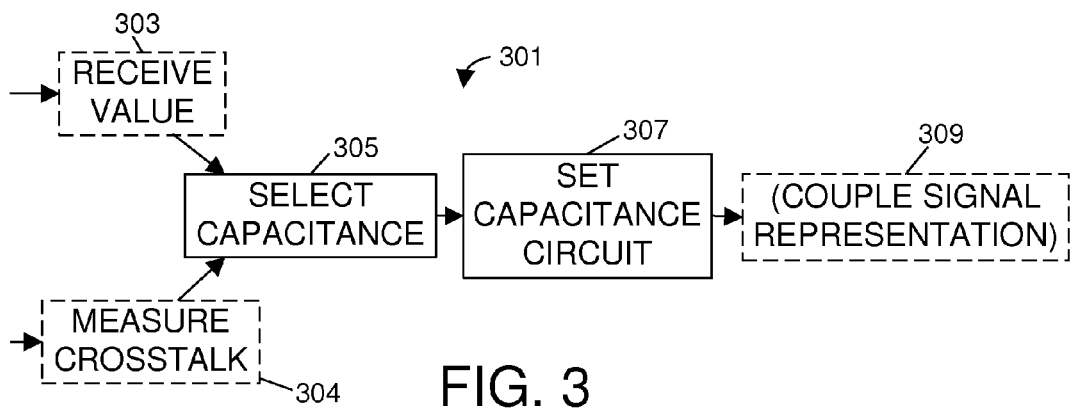
FIG. 3 is a block diagram showing one method of performing calibration to determine the amount of capacitance needed to cancel out far-end crosstalk at a receiver, given a particular bus configuration. As indicated by two dashed-line optional blocks 303 and 304, the method of FIG. 3 may be performed to set capacitance values either in a master device (such as a memory controller), as represented by one of the blocks 303, or in a slave device (such as a memory device), as represented by the other block 304.

FIG. 3 shows one embodiment 301 of a method of performing this tuning. The method may be implemented in a transmitter that is a master device, or a transmitter that is a slave device. For example, in a memory system, a memory controller will typically have substantial control logic, including hardware and firmware not shared by memory devices. Thus, it may be feasible to use the controller to implement calibration functions to set one or more capacitive coupling functions in the controller and/or to provide control for doing the same in a memory device.

As indicated by FIG. 3, a master device receives a value from a slave device, per a first dashed-line block 303. This "calibration value" can be any data useful to the master device as transmitter to set one or more of its capacitive coupling circuits to reduce crosstalk; for example, the data may include voltage values or codes representing the magnitude or effects of crosstalk as experienced by the receiver. In response to these values, the system (e.g., the master device) may determine appropriate capacitance and drive strength/output impedance and may set one or more capacitance circuits in the master device so as to apply these values and to then couple a representation of signal derivatives obtained using these values onto what would otherwise be "victim" signal paths. These functions are represented by reference numerals 305, 307 and 309 in FIG. 3.

Alternatively, as also represented by FIG. 3, a master device can itself directly measure crosstalk, for example, as created by aggressor signals from a remote transmitter (e.g., a memory device providing data read signals); this direct measurement is represented by dashed-line block 304. The master device may then proceed to select (e.g., determine) capacitance, and set (e.g., program) one or more capacitance circuits in the remote transmitter to have appropriate values, so as to cancel inductance-dominated crosstalk; this processing is also represented by reference numerals 305 and 307. The slave device thus, per reference numeral 309, capacitively couples its signals onto each victim path, to negate crosstalk that would otherwise be seen by the master device (i.e., the controller).

With an embodiment that uses capacitive coupling to reduce forward crosstalk in an inductance-dominated transmission system thus presented, additional detail regarding a master-slave implementation will now be presented, with reference to FIGS. 4-10.

II. Implementation in a Master-Slave Environment

A. Implementation

Figure 4:
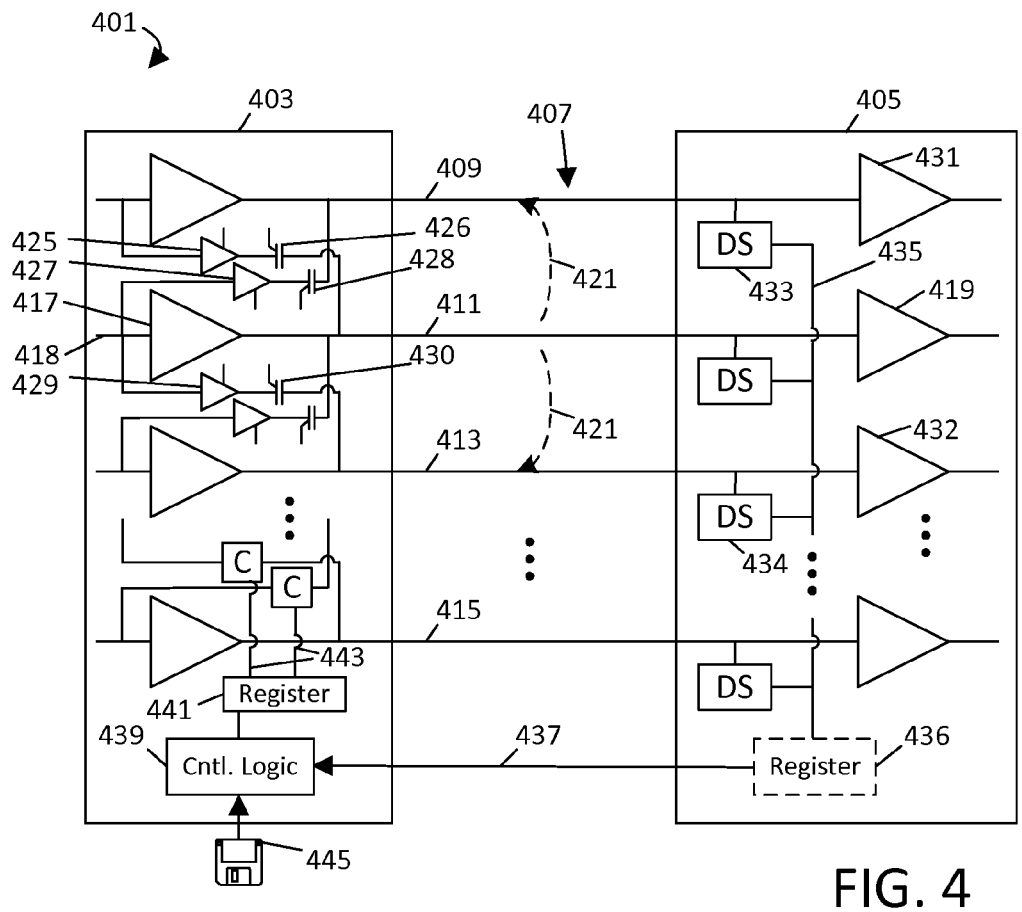
FIG. 4 is a schematic diagram that illustrates a bus including five transmission lines that connect a transmitter 403 to a receiver 405. A second line 411 is depicted as an aggressor, as represented by two dashed-line arrows 421.

FIG. 4 shows an embodiment 401 that includes a transmitter 403, a receiver 405, and a number of lines of a bus 407 connecting the transmitter and receiver. The lines may include control and address ("CA") lines, including clock, chip select, interrupt, data mask and other control lines, data query lines ("DQ") and other lines used for communication. In the discussion that follows, an example implemented will be described in terms of a data bus, but it should be understood that the embodiment may be applied to any lines that connect a transmitter and receiver, and to any subset or combination of lines.

FIG. 4 shows four lines 409, 411, 413 and 415 of an N line parallel data bus 407 (where N may be sixteen or thirty-two, for example). With reference to the second of these lines 411, a driver 417 will switch a single or multi-level signal onto that line for communication to a slicer 419 (i.e., a receiver circuit that generates one or more binary bits according to a symbol conveyed on line 411). Two dashed-line arrows 421 are seen in FIG. 4, each denoting undesirable crosstalk that is induced from the second line 411 onto neighbor lines 409 and 413. Notably, undesirable crosstalk can also arise from other lines (e.g., "two over" lines, or lines further aware than the nearest neighbor, such as the bottommost line 415 in FIG. 4, but crosstalk generally attenuates with the square of distance, and crosstalk from other than the nearest neighbor lines will therefore be ignored for purposes of discussing the embodiment of FIG. 4. Crosstalk from other lines will be discussed below in connection with FIG. 10. Again for ease of discussion, only two dashed-line arrows 421 are seen in FIG. 4, as if only the second line 411 was transmitting and acting as an aggressor, with only the first and third lines 409 and 413 being the victims.

In this example, the driver of each signal line has a capacitive coupling circuit which connects that driver's input signal with the output of the nearest neighbors' drivers. That is to say, for example, the driver 417 of the second line 411 receives an input signal 418 and capacitively couples a representation of this signal onto each nearest neighbor line 409 and 413, to negate the effects of crosstalk on those lines which arise from electromagnetic field effects of the second line 411. To this effect, each representation of the signal 418 passes through a programmable capacitive-coupling circuit that includes a driver with programmable impedance or drive strength (427 or 429) and an adjustable or variable capacitance (428 or 430). The amount of capacitance is calibrated by the transmitter during a calibration mode so as to as closely as possible negate crosstalk on the nearest neighbor lines 409 and 413, as observed at respective slicers 431 and 432 (located at the receiver-end of those lines); by choosing a coupling capacitance for each receiver, and associated drive strength of a derivative signal produced from that coupling capacitance, the transmitter effectively equalizes crosstalk to suit the needs of the particular receiver, given its relative location on the bus and other bus conditions.

Notably, it may be desired to maintain or even adjust the effective output impedance as seen by a driver's signal path; to this end, the drivers (425/427/429) used to capacitively couple signals onto neighbor lines in the embodiment of FIG. 4 have an adjustable output impedance that may be calibrated to ensure a consistent output impedance of all N drivers used for the data bus (again, only four of these are illustrated in FIG. 4). An example adjustable driver suitable to this task will be discussed below in connection with FIGS. 5 and 6, although other circuits and means may also equivalently be employed to this end.

Calibration of capacitance used to equalize crosstalk for the particular receiver may be performed via means of a data sampler, voltage sampler, edge sampler, temporally-roving sampler, or other device within the receiver, illustrated by numerals 433 and 434 in FIG. 4, or using the slicers (419, 431 and 432). In this regard, a copy of each signal received by a slicer may be sampled by such a device and used to provide voltage levels or other information back to the transmitter 403. If desired, digital values representing crosstalk may be fed by an internal bus 435 within the receiver to a register 436 for temporary storage before being passed back to the transmitter 403, either in isolation or aggregate.

In situations in which the transmitter is a master device, the master device may be provided this information over a return data link 437 for storage or interpretation by control logic, represented by numeral 439 in FIG. 4. If desired, control functions may be implemented in part by software (as represented by a disk symbol 445 in FIG. 4) or, alternatively, hardware logic (or a combination of executed software or hardware logic) may be used to isolate and select the proper capacitance for each capacitive coupling circuit and to load this selected value into a register 441. As depicted by reference numeral 443, this register may then be used to control the variable capacitance and programmable output impedance of each capacitance circuit (this control is only shown for the bottommost signal line 415 in FIG. 4, where the combination of driver/programmable output impedance/adjustable capacitance combination is represented by a box labeled "C" for the nearest neighbor paths).

As should be apparent from the foregoing, a master device, such as the transmitter 403 in FIG. 4 may, in a calibration or configuration mode, drive a test signal onto each bit line in turn, and measure the magnitude of crosstalk on nearest neighbor lines; the receiver 405 in fact fixes the measurement, to represent crosstalk seen from its perspective, and it then passes this information back to the controller in the form of a calibration signal. As will be discussed below in connection with FIGS. 8 and 9, one method that may be used by a master device to perform calibration is simply to cycle through a set of predetermined capacitance values that may be selected, and to monitor the calibration signal to detect the minimum crosstalk induced on neighbor lines. By testing each bit line in turn, the controller may then obtain suitable capacitance values for each capacitive coupling circuit used to connect a representation of a drive signal to any adjacent bit line. In the case of an eight line data bus, fourteen such circuits can be used; in the case of a sixteen line data bus, thirty such circuits can be used; and in the case of a "N" line data bus, "2N–2" capacitive coupling circuits can be used (i.e., each signal line in the middle of the data bus is capacitively-coupled with its two nearest neighbors, but lines on the end, such as line 409, will receive coupling from only one nearest neighbor, such as from components 427 and 428 in FIG. 4).

Figure 5:
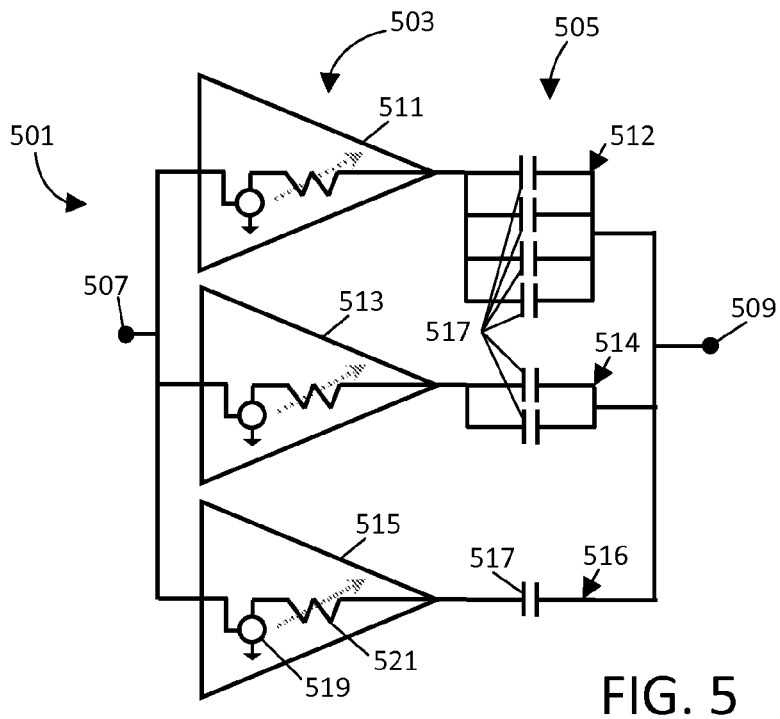
FIG. 5 is a schematic diagram of one embodiment for a capacitive-coupling circuit, such as might connect each nearest neighbor pair. The embodiment in FIG. 5 includes programmable drive and output impedance components 503 and, as seen at the right-hand side of the figure, a number of additive capacitance choices 505.

FIG. 5 shows a circuit diagram for one embodiment of a capacitive coupling circuit 501, namely, one which provides adjustable impedance including selection of eight possible capacitance values built on units of a twenty-five femtofarad (25 fF) capacitor. The circuit may be viewed as including two parts 503 and 505, including a variable drive portion at the left-hand side of FIG. 5 and a variable capacitance portion seen at the right-hand side of FIG. 5. These two parts combine to drive a derivative of an input signal 507 as an output 509 onto a neighbor line. The variable drive in this embodiment includes three individual drive components 511, 513 and 515, each of which may be turned "on" and tuned under the control of hardware or software logic of the master. A register (not seen in FIG. 5) may be used to store values for each circuit and to hold those values in between times of update or recalibration. The right side of FIG. 5 shows three corresponding capacitance networks 512, 514 and 516, each of which includes a number of 25 fF capacitors 517. Since capacitance in parallel is additive, the structure at the right side of FIG. 5 can permit additive combinations of 100 fF (four capacitors), 50 fF (two capacitors) and 25 fF (one capacitor), to provide a range of selectable capacitance between 0 fF-175 fF, in 25 fF increments. By providing more than three drive circuits and three bridges (for example, by providing a fourth bridge having eight parallel capacitors of like value), a circuit could be made to provide for 16 or more selectable capacitances (e.g., 0-375 fF if eight additional capacitors were provided).

It should be noted that the use of 25 fF capacitors is exemplary only, and that a circuit designer may select a different base capacitance value depending on implementation. Similarly, the particular circuit configuration seen in FIG. 5 is exemplary only, and there are many different circuit designs that may be employed to provide the same or similar function.

The bottommost drive circuit 515 is seen conceptually to include two components, including a voltage source 519 and a variable output impedance control 521, which cooperate to provide adjustable output drive for the capacitive coupling circuit (i.e., both to vary signal strength and slew-rate seen from the perspective of the output 509 as well as to tune the way in which the associated capacitance network 511, 513 or 515 affects voltage levels on the neighbor line to which the network is coupled). These components will be further discussed with reference to FIG. 6. As indicated earlier, if desired, the drive circuit may also include other elements if desired to assist with crosstalk negation; for example, in systems in which crosstalk effects are non-linear along the length of transition, the timing of crosstalk may lag, and it may be useful to add a programmable delay element to each capacitive coupling circuit. The addition of such other circuit elements, if desired for a particular implementation, is analogous to the other processes discussed herein and is within the level of ordinary skill of a digital design engineer.

Figure 6:
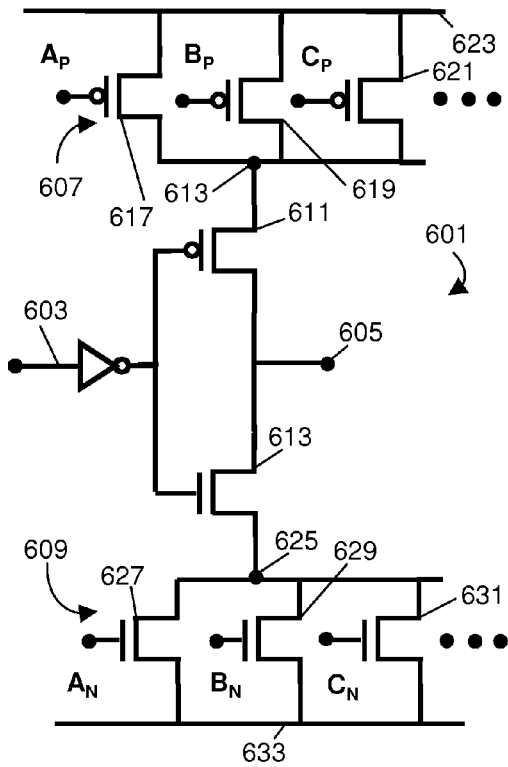
FIG. 6 is a schematic diagram of one embodiment of an adjustable output impedance circuit that may be used to select capacitance choices, tune drive strength and otherwise adjust the way in which a capacitive-coupling circuit affects voltage on a neighbor signal line or path. For example, the circuit depicted in FIG. 6 may be used as one or more the adjustable impedance circuits 511, 513 or 515 seen in FIG. 5.

FIG. 6 illustrates one embodiment of a drive circuit 601 suitable for use as one of the drive components seen in FIG. 5 (511, 513 or 515) or FIG. 4 (such as components 425, 427 or 429). In particular, the function of the drive circuit of FIG. 6 is to selectively couple an input signal 603 to an output 605 and thereby turn "on" linked capacitors to capacitively couple the input signal 603 to a neighbor line (the capacitors are not shown in FIG. 6); more specifically, the drive circuit provides digitally-programmed resistors to effectively define the amplitude of an output signal that will be used for capacitive coupling. The embodiment of FIG. 6 provides this control through the use of six or more control signals, respectively labeled $A_P$, $B_P$, $C_P$ and $A_N$, $B_N$ and $C_N$ (generally represented by numerals 607 and 609, respectively). Each control signal ($A_P$, $B_P$, $C_P$ and $A_N$, $B_N$ and $C_N$, respectively) is used to incrementally determine the drive strength of the circuit of FIG. 6, and is held "high" or "low" under the auspices of a control register (not seen in FIG. 6). As indicated by continuation dots seen at the right side of FIG. 6, additional control signals and transistor segments may be provided to achieve even greater resolution in adjusting the output characteristics of the drive circuit 601.

The logic level of the input signal 603 is effectively used to drive the output 605 by coupling that output to either high or low logic levels, using FETS 611 or 613.

When the input signal is a high logic level, a first FET 611 will be active and will couple the output 605 to a common node 613 of three pMOSFETS 617, 619 and 621 (as well as potentially other nMOSFETS depending on whether additional transistor segments are used). Any combination of signals AP, BP, CP may be used to couple the common node 615 a high voltage level 623; if it is desired to "turn off" the particular capacitance (not seen in FIG. 6) associated with the drive circuit, then all three control signals AP, BP, CP are held high; if it is desired to turn "on" the associated capacitance, then one of more of the control signals is held to a logic low level by the control register settings.

Similarly, when the input signal 603 is a logic low level, a second FET 613 will be active, thereby coupling the output 605 to a second node 625; a reciprocal pair of pMOSFETS 627, 629 and 631 couple this second node to a logic low level, carried by a line 633. Generally speaking, each pair of control signals, $A_P$-$A_N$, $B_P$-$B_N$ and $C_P$-$C_N$ will be the logical inverse of one another to provide a consistent output impedance whether the input signal 603 is a logic high or low; however, this result does not necessarily have to be the case. For example, nMOS and pMOS devices may exhibit different impedance or switching characteristics, and the provision of separate control over the impedance connections to logic high and low voltage levels generally facilitates greater control over the drive component 601 (e.g., enabling separate control of rising and falling edge rates) as well as the entire nearest neighbor signal path. By providing control and flexibility in tuning the output impedance of the drive component (and the capacitive coupling circuit overall), the design presented by FIG. 6 provides greater flexibility to a circuit designer in using the circuits and principles provided by this disclosure for a variety of purposes.

Figure 7:
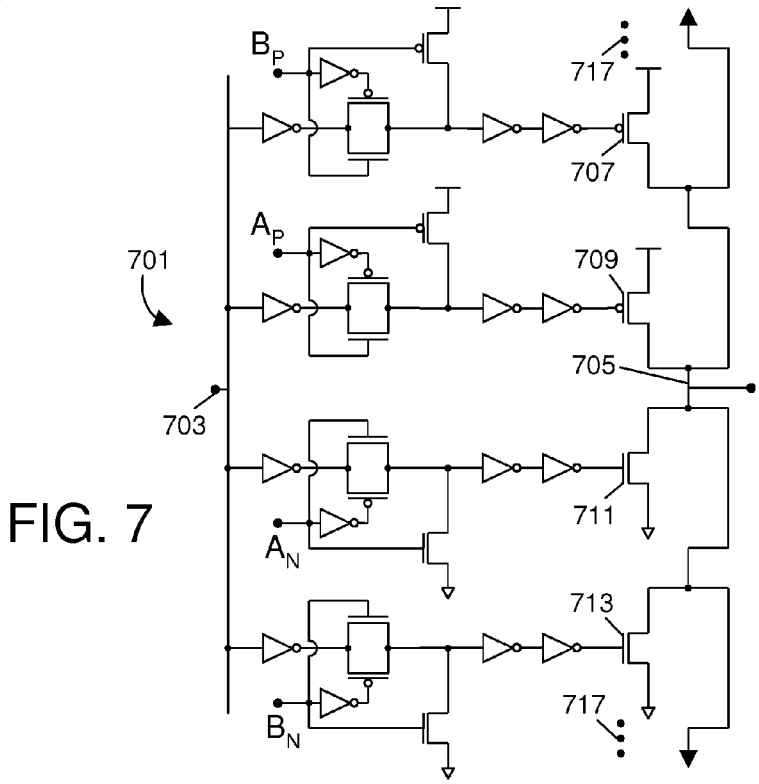
FIG. 7 is a schematic diagram of a second embodiment of an adjustable output impedance circuit, an alternative to the embodiment of FIG. 6.

FIG. 7 shows an alternative implementation 701 of a drive component. As was the case with the embodiment presented above, the circuit seen in FIG. 7 provides a system with control over both the amount of drive current and capacitance, seen from the perspective of a neighbor line. An input node 703 of FIG. 7 receives a representation of a drive signal (such as is fed to a driver for output along a bit line of a parallel data bus); enable signals (labeled $A_P$, $B_P$, $A_N$ and $B_N$ in FIG. 7) are used to selectively couple this representation to an output 705 (for an associated capacitance network not seen in FIG. 7), and to provide adjustable drive through the control of nMOS and pMOS transistors (labeled 707, 709, 711 and 713 in FIG. 7). FIG. 7 differs from FIG. 6, in that only two transistor stages "A" and "B" are depicted, but third or additional stages could be added (e.g., stage "C"); this expansion possibility is represented by two series of continuation dots 717.

Returning to FIG. 5 briefly, it should be noted that the circuit 501 is depicted as including three drive components 511, 513 and 515; generally speaking, the default output impedance for the drive components will be changed depending on how many drive components are used to actively drive the output 509, so as to maintain a consistent resistance to capacitance (R/C) ratio notwithstanding the amount of capacitance selected for purposes of capacitive coupling. Thus, if only the first drive component 511 is initially active, but a system then recalibrates capacitance and decides to activate the second drive component 513 as well, the control inputs for each drive component ($A_P$, $B_P$, $C_P$ and $A_N$, $B_N$ and $C_N$ from FIG. 6 or FIG. 7) may be correspondingly reset to different values, in order to maintain if desired consistent drive strength.

B. Use of a Configuration Mode

Figure 8:
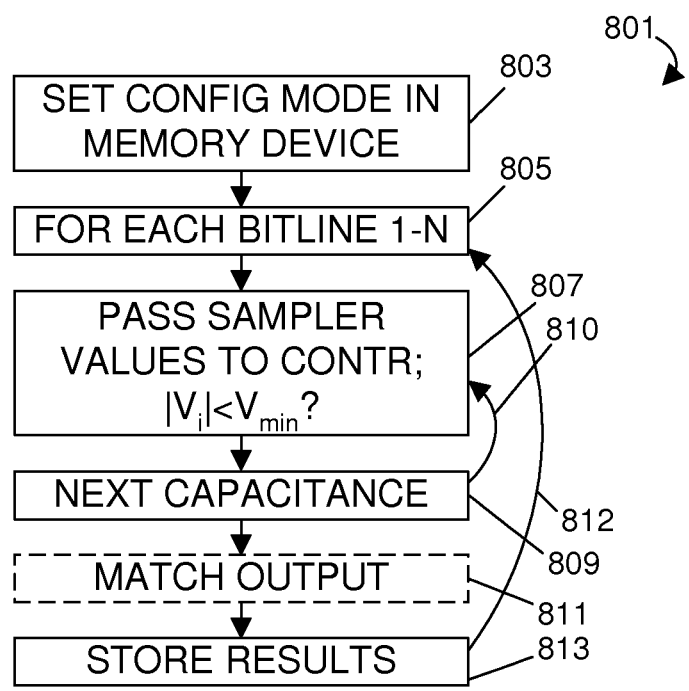
FIG. 8 is a block diagram, similar to FIG. 3, but which shows flow of a method 801 for a master device (such as a memory controller) to set capacitive-coupling for N signals that it transmits (where N can be any number, such as 16 for a 16-line parallel bus). As indicated by FIG. 8, the master device may in a configuration mode receive a calibration signal from a receiver that represents measured crosstalk; the master device may then store results (i) for each capacitive coupling circuit (ii) for each receiver.
Figure 9:
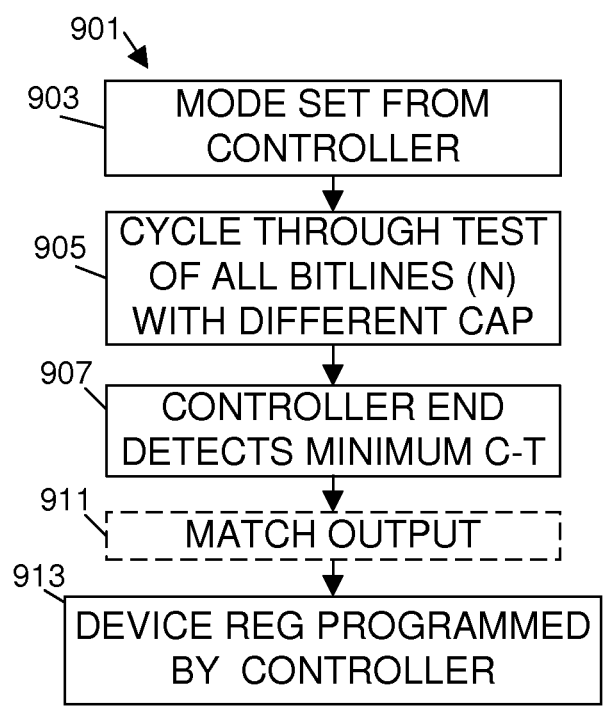
FIG. 9 is another block diagram, similar to FIG. 8, but which shows flow of a method 901 in a slave device (such as a memory device). The block diagram of FIG. 9 is somewhat simpler than the previous diagram, as in this embodiment the slave device communicates with only one master device (hence its capacitance values remain constant for all of its outgoing transmissions). As indicated by reference numeral 913, the slave device may have capacitance values (and output impedance values) measured by the master device and programmed into one or more registers of the slave device.

As mentioned above, the various levels of capacitive coupling and drive strength provided by a capacitive coupling circuit may be calibrated and programmed for each driver/neighbor line pair, as well as for each receiver that a given transmitter may "talk to." Capacitance is ideally selected to cancel the effects of far-end, inductance-dominated crosstalk at the particular receiver, and output drive is selected to provide a consistent voltage response that seeks to mimic an ideal situation of no crosstalk; control over output drive strength (and output impedance) may also be used to provide a system designer with additional control over the various signal paths of a system. FIGS. 8 and 9 illustrate two methods by which each drive/neighbor line pair may be calibrated to select the "appropriate amount" of capacitance.

In particular, FIG. 8 presents one example 801 of a method by which a master device may perform this calibration in order to set capacitive coupling circuits for its own drivers. The master device first enters a configuration mode (as represented by numeral 803) and identifies this to the slave device, for purposes which will be described below. The configuration mode may be a part of a periodic calibration performed the master device, for example, a general timing or circuit calibration, to tune performance vis-à-vis a slave device.

In the example of FIG. 8, while a slave device (e.g., a memory device) is normally responsive to communications across all lines of its bus (for example, all lines of a parallel data bus, relative to the example introduced by FIG. 4), the configuration mode is set so as to enable the memory device to assist with measurement of crosstalk experienced by each of its various slicers. The master device (e.g., a controller) initiates calibration by introducing a test signal on each individual line, with the slave device monitoring response on each line of the bus, especially including the neighbor lines (which would be the expected subject of undesired forward crosstalk). For example, as indicated by reference numeral 805, the master device may sequentially place a test signal on each of N lines of a N bit wide data bus.

There are a number of different methodologies that may be used by a master device to perform this configuration. For instance, one approach is to select in turn each possible capacitance value and repeat the test signal once for each value. For example, as alluded to by reference numerals 809 and 810 in FIG. 8 (again using the example of FIG. 5, which presented eight possible choices for capacitance), a master device may simply repeat the test signal for each signal line eight times, each time with a different coupling circuit capacitance; as indicated by a function block 807, the slave device returns a "calibration signal" which represents a measure of crosstalk experience by the slave device, and the master may simply isolate the particular one of the capacitance values that best mitigates the effects of crosstalk on each neighbor line. If desired, the master device may also recalibrate drive strength and adjust the effective output seen by neighbor lines (as represented by dashed-line block 811 in FIG. 8). Once the master device has selected a capacitance value for each capacitive coupling circuit, it stores the values in an appropriate register for use during run-time operations, as indicated by function block 813. In an environment where multiple receivers are connected to a given transmitter, a different receiver may then be selected, and the configuration process repeated, as represented by a return arrow 812.

As mentioned, other configuration methodologies may also be used. For example, instead of progressing through each possible capacitance value, a master device may "test" the effects of increasing and decreasing capacitance relative to a previous or default value, and may maintain the existing capacitance value if the effect of either increase or decrease is to increase crosstalk; the master device could then move on to the next driver/neighbor line configuration. If desired, the master device may also maintain the setting from a previous line's calibration as the starting point for the testing of a subsequent capacitive coupling circuit. Testing may also be performed only once for a given system (e.g., at time of system initialization) or may be re-performed occasionally to reconfigure the system as temperature and other environmental factors change. Alternatively, following initial calibration, a mathematical model (or algorithm) may be used to change capacitance or drive strength without performing circuit testing. Finally, instead of a trial-and-error process, a number of optimization algorithms (such as LMS or least-mean-squares) may also be used to assist calibration.

FIG. 9 shows a second example 901 of a method that may be used to identify an appropriate capacitance, the method being used to program capacitive coupling circuits that will be used by a slave device (such as a memory device) during times when it acts as transmitter. In particular, the device first has a configuration mode set from a master device, such as a memory controller, per numeral 903; some non-memory applications may feature a configuration mode specifically requested by a slave device but, in the embodiment of FIG. 9, it should be assumed that the master device has the "brains," i.e., the hardware and instructional logic to assume control of the system and dictate special modes of operation, such as a configuration mode. The mode may be set via any one of a number of well-known methods such as, for example, by instructing the slave device via a sideband link, writing an appropriate value into a control register within the slave device, or setting a special bit line such as an interrupt, or perhaps by some other method. The slave device accordingly configures its circuitry to generate a sequence of stored, predetermined test signals, testing one or more bit lines at a time. In one method of implementing calibration, the master device can compare received signal levels to multiple thresholds to detect rough magnitude of crosstalk, or to detect when crosstalk transitions from a negative signal to a positive signal, or vice-versa; in other methods, the master device can use data samplers to specifically measure and detect voltage levels at specific units of time. In still other methods, a designer may provide for more complex waveform analysis. Irrespective of the specific methodology use, the testing is performed for any number of lines that are to be the subject of calibration, for example, sixteen lines of a sixteen bit wide parallel data bus. Provided with calibration data on each data line, the master device detects the minimum level of crosstalk and responsively identifies to the slave device the test pattern that produced this minimum, to select an associated capacitance value (as indicated by numerals 905 and 907 in FIG. 9). As alluded to earlier, the master device may also send other forms of calibration data back to the device that placed test signals on the line, for it to detect the appropriate capacitance. Finally, with the appropriate capacitance determined, the method may call for adjustment of drive strength associated with each capacitive coupling circuit, and the master device may program appropriate values, including capacitance, into a register associated with the slave device (as indicated by numerals 911 and 913). The master device may then proceed to other calibration tasks, or may take the slave device out of the configuration mode.

C. Coupling to Reduce Second or Lower Order Crosstalk

For ease of understanding, the embodiments presented above addressed the issue of crosstalk cancellation only for crosstalk arising from nearest neighbor lines. For example, with reference to FIG. 4, crosstalk was explained in terms of shadow signals created by one transmission line, for example, line 411, and driven into two nearby neighbor lines 409 and 413; to address this crosstalk, a representation of the signal used to drive transmission line 411 was capacitively coupled until neighbor lines 409 and 413 and driven using capacitive coupling circuits (exemplified by FIGS. 5-7) to cancel out inductance-dominated crosstalk.

In fact, crosstalk can arise from lines other than a nearest neighbor. Using the example of a sixteen line bus, for example, crosstalk affecting the $5^{th}$ most significant bit ("MSB") can arise from signals occurring on potentially any line in the bus, including the $1^{st}$, $2^{d}$, $3^{d}$, $4^{th}$, $6^{th}$, $7^{th}$, $8^{th}$ MSB, and so on. Generally speaking, in many environments (such as using for example, a micro-strip bus), a consistent spacing "x" will be used between each line in the bus and its neighboring line or lines, such that approximately "2x" spacing exists between lines that are "two over", "3x" between lines that are "three over," and so forth. Generally speaking, in a typical micro-strip bus arrangement, a common spacing between lines might be 300 microns, with each line having a path width of approximately 100 microns. Since crosstalk falls off with the square of the distance between lines, crosstalk arising from "two over" lines in a micro-strip bus can generally be expected to be only about one-quarter as significant as nearest neighbor crosstalk, while crosstalk arising from "three over" lines can generally be expected to be only about one-ninth as significant as nearest neighbor crosstalk. The embodiment presented in FIG. 4 above presents certain advantages, because it balances nearest neighbor crosstalk cancellation with a simple structure, and because it does not deal with less significant crosstalk effects (such as from a non-nearest neighbor line).

Nevertheless, in some embodiments, especially those that feature more complex routing patterns (such as a differential system, discussed below), it may be desired to capacitively-couple signals between non-nearest neighbors; similarly, as technology continues to progress, data eye timing may become sufficiently tight that second or third order crosstalk becomes significant.

Figure 10:
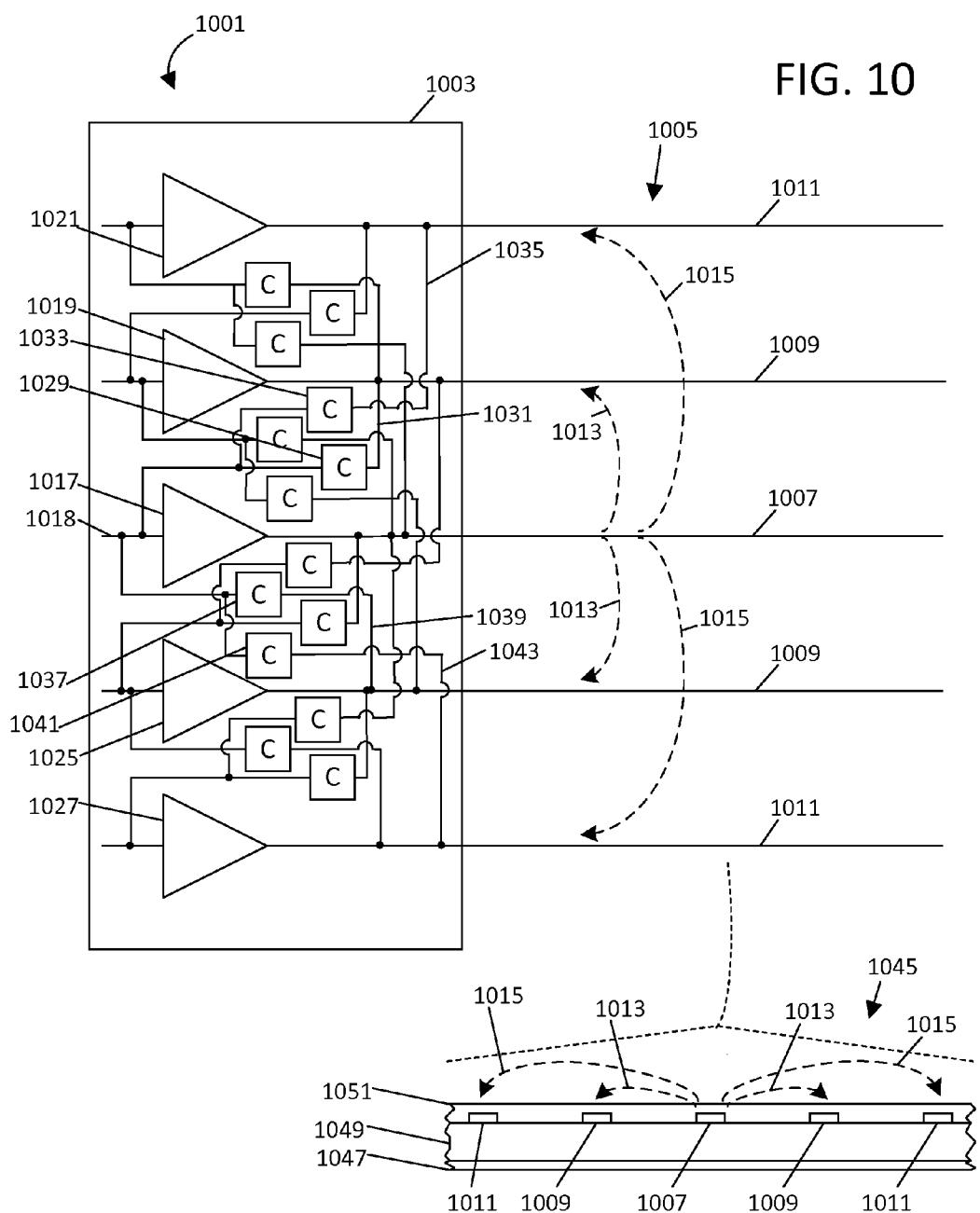
FIG. 10 is a schematic diagram of an embodiment 1001 that provides capacitive coupling crosstalk reduction circuits for up to four nearest neighbors (i.e., up to two on either side of a given line in a substantially planar bus). As an example, in FIG. 10, a driver 1017 has a representation of its driving signal coupled both onto adjacent neighbor lines (each designated by numeral 1009) as well as onto lines that are "two over" (represented by two instances of numeral 1011). An expanded sectional view 1045 at the bottom of FIG. 8 shows configuration of the bus as a "micro-strip" bus.

FIG. 10 is therefore provided to illustrate an example embodiment which deals with crosstalk that arises from lines which are "two over" (or with any line other than a "nearest neighbor" as that term has been used above). The approach used in the embodiment of FIG. 10 is similar to that discussed above in connection with FIG. 4, except that a representation of each drive signal is capacitively-coupled and driven onto either two, three or four lines (depending on whether the signal is at the end of a bus, is "one in" or is in the middle of a bus). Since the crosstalk arising from these lines decreases with the square of distance, it can be expected that for any given line, the capacitance used to capacitively couple "two over" lines to an input signal for the given line will be at most no greater than the ratio of (a) distance between the given line and the "two over" line, to (b) distance between the given line and its nearest neighbor in the same direction, relative to the capacitance used to couple the nearest neighbor. That is to say, in an embodiment in which lines are consistently spaced from one another, such as with micro-strip routing, the capacitance for "two over" lines should be no more than one-half the capacitance used to capacitively couple nearest neighbor lines, and will generally be about one-quarter of that capacitance.

FIG. 10 shows a transmitter 1003 and an exemplary bus 1005 that has just five bit lines, including a central line 1007, two nearest neighbors 1009 (for the central line), and two lines 1011 that are "two over" from the central line. For ease of understanding, crosstalk arising from signals placed on the central line will be primarily discussed, but it should be noted that crosstalk may arise between any combination of two lines represented in FIG. 10; the embodiment in FIG. 10 calls for addressing the crosstalk issue by using a capacitive coupling circuit to couple a derivative of each transmission signal onto its one or two nearest neighbors and onto its one or two of its non-nearest neighbors. Thus, for the circuit depicted in FIG. 10, the transmitter includes fourteen capacitive coupling circuits (corresponding to 2*(2N−3), where "M" is the number of data lines that are to be capacitively coupled in a "two over" capacitive coupling system). In FIG. 10, the effects of crosstalk exited by transmissions on the central line 1007 onto its pair of nearest neighbors and pair of "two over" neighbors is represented by two pairs of arrows, respectively labeled 1013 and 1015.

The transmitter 1003 in FIG. 10 is seen to include five drivers 1017, 1019, 1021, 1025 and 1027, respectively, each driving one of the signal lines mentioned above. The driver 1017 that drives the central line receives an input signal which, as mentioned above, is to be capacitively coupled onto the four nearest lines using four capacitive coupling circuits; a first capacitive coupling circuit 1029 couples a derivative signal onto a first nearest neighbor line, as represented by numeral 1031; a second capacitive coupling circuit 1033 couples a second derivative signal 1035 onto a "two over" line; a third capacitive coupling circuit 1037 drives a derivative of the input 1018 onto another nearest neighbor, via path 1039; and finally, fourth capacitive coupling circuit 1041 drives a derivative of the input signal onto the second "two over" line, as indicated by a path 1043. Generally speaking, in a system with consistent line spacing, the two capacitive coupling circuits 1029 and 1037 that drive signals onto a nearest neighbor to the central line will have a relatively strong, similar or identical capacitance value, while the two circuits 1033 and 1041 which couple "two over lines" will have much weaker capacitance and drive strength, generally on the order of one-quarter or less relative to that used for the nearest neighbors.

The bottom of FIG. 10 illustrates a close-up, cross sectional view 1045 of the bus 1005, implemented in a configuration of a micro-strip bus. The micro-strip bus includes a ground plane 1047, a substrate layer 1049 (which rests atop the ground plane) and an encapsulation layer 1051, the latter being used to insulate each individual signal line (1011, 1009, 1007, 1009 and 1011) from each other and from other electrical components (outside of the system depicted in FIG. 10).

As indicated earlier, crosstalk becomes negligible at distance; while in many system embodiments it may not be necessary to deal with crosstalk between anything other than nearest neighbors of each line, the embodiment presented by FIG. 10 presents a framework that may be extended between any number of lines in the system, by using capacitive coupling circuits to couple (or cross-couple) those lines as necessary.

D. Applying the Appropriate Amount of Capacitive Coupling, Revisited

Figure 11:
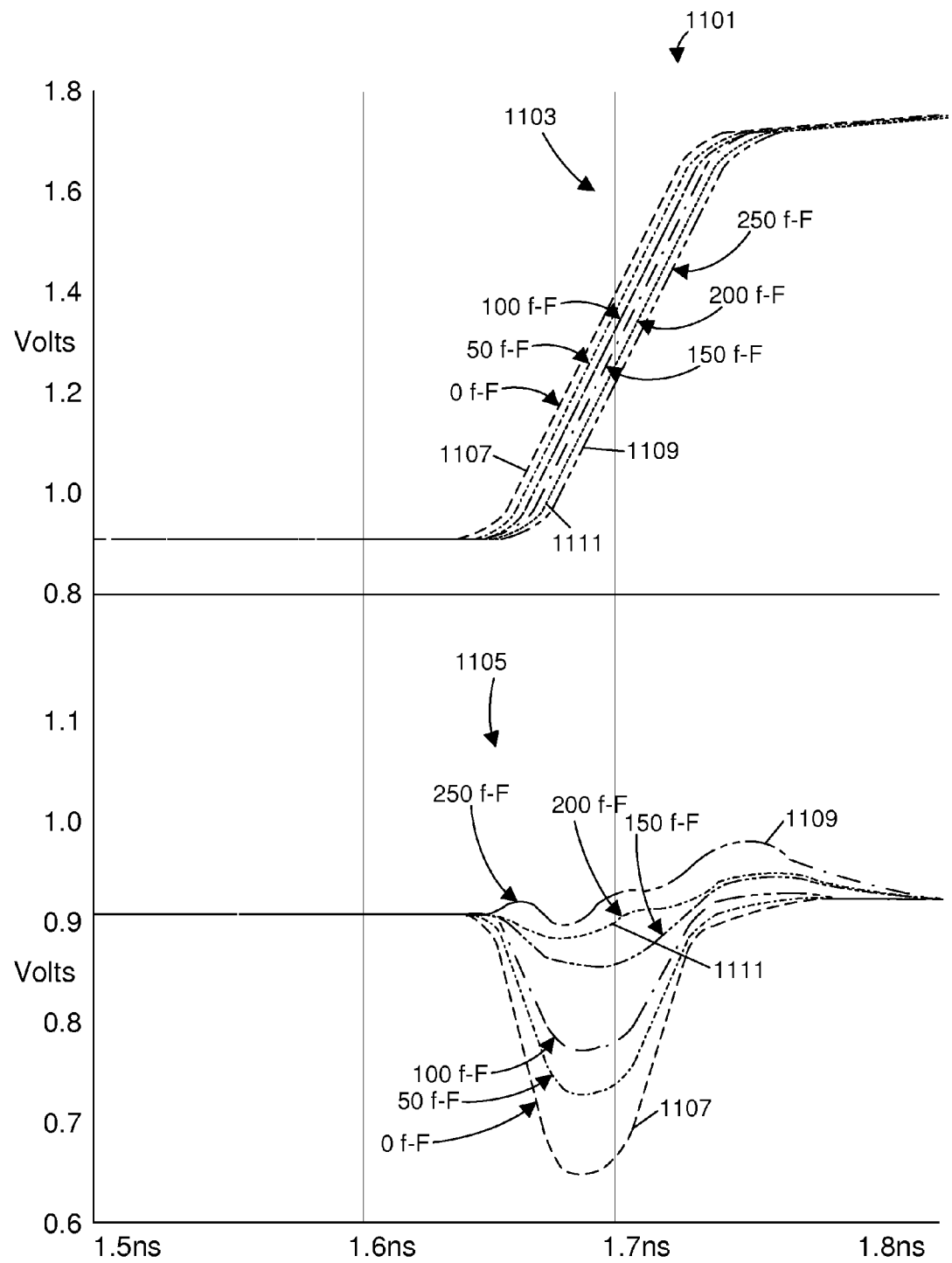
FIG. 11 is a two-part graph 1101, showing an upper portion 1103 and a lower portion 1105. The upper portion 1103 plots six curves, each representing a logic/voltage waveform of an aggressor line, each depicted using different line patterns. The lower portion 1105 shows corresponding crosstalk/voltage waveforms as they appear on a victim line, using same line patterns as used in the upper portion. Each line pattern pair in FIG. 11 corresponds to a different cross-coupling capacitance, identified as zero femtofarads ("0 fF"), fifty femtofarads ("50 fF"), one-hundred femtofarads ("100 fF"), one-hundred-fifty femtofarads ("150 fF"), two-hundred femtofarads ("200 fF") and two-hundred-fifty femtofarads ("250 fF"). It should be noted that the graph of FIG. 11 is exemplary only, i.e., the actual capacitance needed in practice to negate crosstalk between neighbor lines will vary depending on bus length, separation between wires, whether or not shielding is used in the bus, and many other factors.

FIG. 11 presents a graph 1101 that illustrates an example of the application of capacitive coupling provided by the embodiments discussed above. FIG. 11 is in fact a two-part graph, having an upper half 1103 that plots six different curves against time (voltage is represented by the Y-axis), and a lower half 1105 that plots crosstalk on a nearest neighbor line (voltage here also is represented by the Y-axis), again using the example of a micro-strip bus. Both the upper and lower halves use a common X-axis, representing time in nanoseconds (ns).

The six curves in the upper half 1103 correspond to the six curves in the lower half 1105 and are depicted using corresponding line dash patterns.

As an example, a first line pattern represents no capacitive coupling and is represented by reference numeral 1107 in both the upper and lower halves 1103 and 1105 of FIG. 11. As seen in the upper half, the transmission signal begins rising from a logic "zero" (approximately 0.9 volts) at 1.65 nanoseconds, and levels off at a logic "one" (approximately 1.7 volts) at about 1.73 nanoseconds. The inductance-dominated crosstalk induced on each neighbor line is represented in the lower half of FIG. 11 and, as indicated by numeral 1107, results in a negative "dip" of nearly 0.3 volts in the voltage level of each neighbor line; left unchecked, this crosstalk could interfere with a transmission signal sent at the same time along that line. This interference could make it difficult to determine whether a logic "one" or "zero" exists on that line, as well as whether and when an edge transition is occurring.

As a second example, the sixth line pattern represents capacitive coupling using a capacitance selected to be 250 fF (femtofarads), and is designated in the upper and lower halves 1103 and 1105 of FIG. 11 by reference numeral 1109. As seen in the lower half 1105 of FIG. 11, this capacitance results in a derivative signal (a counterpulse) which nearly cancels out the voltage drop represented by numeral 1107; in fact, the capacitance selected is slightly "too strong" as depicted by the relative results seen in FIG. 11, and results in a slightly positive signal of approximately 0.08 volts on the neighbor line. This excess coupling could also render neighbor line transmission interpretation difficult and so, with reference to FIG. 11, it is seen that a better choice (if available) might be a capacitance that further minimizes crosstalk, producing as close to zero crosstalk relative to the logic "low" state (0.9 volts) as possible. This minimum is seen in FIG. 11 to be approximately 200 fF, i.e., the curve designated by reference numeral 1111.

III. Application to a Memory System

A. Memory Controller And Multiple Memory Devices

Selecting an appropriate capacitance value for use in capacitive coupling provides a straightforward way to adjust capacitance so as to negate, almost completely, crosstalk seen by any particular receiver. By adjusting capacitance, whether continuously or over discrete capacitance values (as exemplified by the embodiments presented above, notably, the embodiment seen in FIG. 5), the techniques disclosed herein facilitate a system that can be quickly tuned for each communication to any particular receiver.

In the embodiments that follow, these principles will be applied to a system that quickly changes capacitance and output impedance to each receiver in a multi-receiver system; again, the example that will be used is a memory controller acting as a transmitter, communicating with multiple memory devices, any one of which may be a receiver (depending on which of the memory devices (or group of memory devices) is being addressed). Because each receiver in this example is in a slightly different location relative to the transmitter (based on signal path routing, terminations, temperature, and many other factors), the capacitance values determined for one receiver may, if applied to a different receiver, result in improperly balanced crosstalk; therefore, the embodiments presented below use different, quickly loaded capacitance values and drive values which are updated by the transmitter for every transmission to a different receiver (e.g., to each particular memory device).

Figure 12:
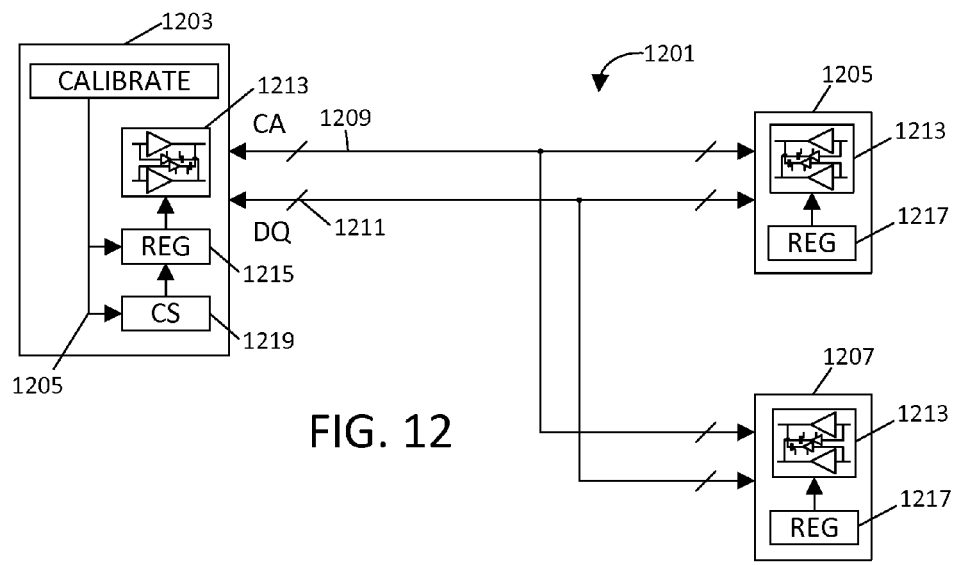
FIG. 12 is a schematic block diagram showing an embodiment 1201 where each of a memory controller 1203 and two memory devices 1205 and 1207 have capacitive-coupling circuits used to reduce crosstalk when those devices (either the controller or memory devices) act as a transmitter. The memory controller may hold capacitance values dedicated to path routing for each memory device and may set its capacitive cross-coupling circuits under control of a chip select signal 1219, whereas the capacitance values of the memory devices remain static (at least until a subsequent recalibration).

FIG. 12 depicts a memory system 1201 having a memory controller 1203 and two memory devices 1205 and 1207. The controller communicates bi-directionally with each memory device (as data is read from and written to a selected memory device), and so, at any given time, each device may act as a transmitter or a receiver. The devices are seen to be commonly coupled by a command and address ("CA") bus 1209, as well as a parallel data bus 1211. The capacitive coupling principles introduced above may be applied to reduce crosstalk between any of these lines, and a cross-coupling signal 1213 is depicted with the controller and each of the devices to indicate cross-coupling between pairs of wires when the associated device acts as a transmitter.

In the example of FIG. 12, the memory controller may interact with either memory device, and uses a register 1215 to store capacitance and drive strength values for each capacitive coupling circuit in dependence on the memory device which is selected; the memory devices also each have a register 1217 to store capacitance and drive strength values, but since these devices only communicate with the controller (i.e., in the embodiment of FIG. 12), these resisters only need to store one static value for each capacitive-coupling circuit. As indicated by reference numeral 1219 in FIG. 12, the controller may use a chip select ("CS") signal to discriminate between register values, and to load the capacitive coupling circuits with capacitance values appropriate to equalize crosstalk in the device being addressed using the chip select.

While one specific example has been presented that uses multiple register values and a chip select to distinguish between different receivers, many other mechanisms exist in the typical system which permit the tailoring of capacitance values to a particular receiver, whether during a configuration mode or during run-time.

The example presented by FIG. 12 may be extended to any number of transmitters and receivers, each communicating with multiple devices, or only a single device.

B. Application to a Differential System

Figure 13:
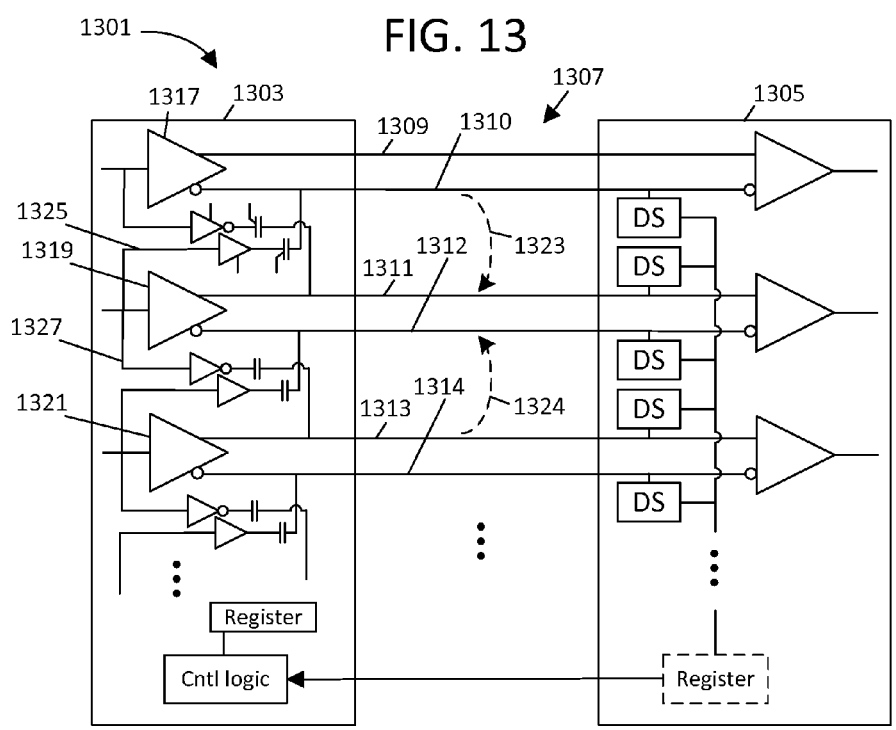
FIG. 13 is a diagram similar to FIG. 4, but which illustrates one embodiment that uses capacitive cross-coupling circuits in a differential signaling environment.

FIG. 13 is used to illustrate the capacitive coupling principles presented, and calibration and configuration methods, to the environment of a differential data transmission system. A differential system is one that uses two lines to transmit both logic states at once, and it provides advantages to certain types of system implementations; for example differential signaling can facilitate use of certain types of encoding (including use of an encoded, embedded clock signal), consistent switching characteristics and consistent power consumption characteristics. Sometimes, a differential pair of wires will be routed in much the same manner as provided above, often with one or more "twists" being provided along the path length of the differential pair, to minimize crosstalk and other electromagnetic field artifacts.

In particular, FIG. 13 presents a system 1301 that includes a transmitter 1303, a receiver 1305 and a bus 1307. Each pair of wires, such as pairs 1309/1310, 1311/1312 and 1313/1314 is driven by a specific differential driver (these drivers are respectively labeled 1317, 1319 and 1321 in FIG. 13). The tendency for crosstalk is symbolized in FIG. 13 by a pair of arrows 1323 and 1324, with each arrow representing inductive crosstalk from a different source (i.e., from signal line 1310 in the case of transmission line 1311, and from signal line 1313 in the case of transmission line 1312). Thus, differential crosstalk may be created for a differential pair, such as the lines 1311 and 1312 (e.g., each given differential signal may be collapsed or exploded by crosstalk), which may create errors in using the differential signal, for example, for edge detection.

The embodiment of FIG. 13 addresses these issues by using capacitive coupling circuits to capacitively couple a version or representation of a transmission signal onto the closest line of a neighboring differential pair. For example, as depicted at the left-hand side of FIG. 13, a derivative of the drive signal for the second driver 1319 may be coupled onto signal path 1310, and a derivative may also be coupled onto path 1313, as depicted by numerals 1325 and 1327, respectively.

Although not illustrated in FIG. 13, if each differential pair may be "twisted" en route to the receiver, such that a different line within each pair is moved closer to another signal in a manner that gives rise to inductance-dominated crosstalk, "two over" capacitive coupling circuits may also be used in the manner discussed above for FIG. 10. Under these circumstances, capacitances and drive strengths for the "two over" lines (because those lines are adjacent a nearest neighbor and because they form a part of the same differential pair in common with the nearest neighbor) will be much closer to the values used by the nearest neighbor and in at least some cases, identical values may be used. Significantly, however, the principles presented above permit automated calibration of far-end crosstalk occurring between each signal line pair based on receiver location and, thus, it matters not whether the differential pair is twisted, i.e., the transmitter can simply measure and load capacitance values that best negate crosstalk and use these values in transmitting signals on each signal path, as appropriate.

IV. Conclusion

What has been described are devices and methodology for reducing crosstalk by driving a representation of an aggressor signal onto one or more victim lines in a manner adapted to match and directly cancel out, at a receiver, crosstalk otherwise induced by the aggressor signal. A configuration method has also been presented for obtaining capacitance values that may be used to perform this equalization. Other applications will readily occur to those having skill in the art in view of the teachings provided above, or in view of the invention defined by the claims set forth below. Also, features or aspects of any of the above embodiments may be applied, at least where practicable, in combination with any other of the above embodiments or in place of counterpart features or aspects thereof.

Accordingly, the foregoing discussion is intended to be illustrative only; other designs, uses, alternatives, modifications and improvements will also occur to those having skill in the art which are nonetheless within the spirit and scope of the present disclosure, which is limited and defined only by the following claims and equivalents thereto.

The invention claimed is:

1. A transmitter to convey signals to a receiver over a parallel bus that includes at least first and second signal lines, comprising:
   a first driver to transmit a first signal to the receiver via the first signal line;
   a second driver to transmit a second signal to the receiver via the second signal line;
   a first coupling circuit to capacitively-couple a representation of the first signal to the second signal line; and
   a second coupling circuit to capacitively-couple a representation of the second signal to the first signal line;
   where each of the first coupling circuit and the second coupling circuit comprises a driver in series with a capacitor.

2. The transmitter of claim 1, wherein the parallel bus is embodied as an inductance dominated data bus.

3. The transmitter of claim 1, wherein the parallel bus is embodied as a micro-strip line bus.

4. The transmitter of claim 1, where each of the first coupling circuit and the second coupling circuit includes:
   an active driver; and
   a capacitance circuit that couples the output of the active driver to a signal line.

5. The transmitter of claim 4, where the capacitance circuit has an adjustable capacitance.

6. The transmitter of claim 5, wherein the adjustable capacitance is adjustable to one of a predetermined set of discrete capacitance values.

7. The transmitter of claim 5 where the adjustable capacitance is dynamically programmable.

8. The transmitter of claim 4, where each of the first coupling circuit and the second coupling circuit has an adjustable drive strength.

9. The transmitter of claim 4, where each of the first coupling circuit and the second coupling circuit further includes an adjustable output impedance.

10. The transmitter of claim 1, wherein the parallel bus also includes at least a third signal line, the transmitter further comprising:
- a third driver for transmitting a third signal to the receiver via the third signal line;
- a third coupling circuit to capacitively-couple a representation of the third signal to the first signal line; and
- a fourth coupling circuit to capacitively-couple a representation of the third signal to the first signal line.

11. The transmitter of claim 10, wherein the third signal line is separated from the first signal line by a first average distance and from the second signal line by a second average distance, greater than the first average distance, and wherein a capacitance applied by the third coupling circuit is greater than a capacitance applied by the fourth coupling circuit.

12. The transmitter of claim 1, where the transmitter is configured to receive feedback from the receiver representing measured far end crosstalk, and to dynamically program a capacitive-coupling value for the first coupling circuit.

13. The transmitter of claim 1, where the first coupling circuit includes an active driver.

14. The transmitter of claim 13, where the active driver is programmable to define a drive strength with which the representation of the first signal is capacitively-coupled to the second signal line.

15. The transmitter of claim 1, where the first and second signals comprise constituent bits of a multi-bit symbol, with a first of the constituent bits transmitted over the first signal line and a second of the constituent bits transmitted over the second signal line concurrently.

16. The transmitter of claim 1, where the first coupling circuit includes:
- a plurality of MOSFETS selectively controlled to provide adjustable drive strength; and
- a programmable capacitance circuit coupling a collective output of the plurality of MOSFETS with the second signal line.

17. A system, comprising:
- a transmitter circuit;
- a receiver circuit;
- a parallel bus coupling the transmitter and the receiver, the parallel bus including two signal lines which are adjacent to each other and which convey respective first and second signals from the transmitter circuit to the receiver circuit;
- where the transmitter circuit comprises a driver for each of the two signal lines to transmit a respective signal to the receiver; and
- a coupling circuit for each one of the two signal lines to capacitively-couple the respective signal conveyed by the one of the two signal lines to the other of the two signal lines;
- where each coupling circuit comprises a driver in series with a capacitor.

18. The system of claim 17, where one of the transmitter circuit or the receiver circuit is embodied in a memory device and the other of the transmitter circuit or the receiver circuit is embodied in a memory controller.

19. The system of claim 17, where the parallel bus includes a micro-strip line bus.

20. The system of claim 17, where each coupling circuit includes an active driver to actively drive the respective signal onto the other of the two signal lines.

21. The system of claim 20, where each coupling circuit has a programmable drive strength to vary how strongly each respective signal is capacitively-coupled onto the other of the two signal lines.

22. The system of claim 20, where each coupling circuit has a programmable capacitance to vary extent with which the respective signal is capacitively-coupled onto the other of the two signal lines.

23. The system of claim 22, where the transmitter circuit is configured to receive feedback from the receiver representing measured far end crosstalk for each of the two signal lines, and to dynamically program a capacitive-coupling value for each coupling circuit.

24. The system of claim 17, where the coupling circuits and the transmitter circuit are collocated on a single component.

25. The system of claim 17, where the transmitter circuit is operable in a test mode to calibrate each signal line of the parallel bus for effects of far end crosstalk.

26. A transmitter to convey, over a parallel bus that includes at least four constituent signal lines, at least first and second respective signals to a receiver, the transmitter comprising:
- a driver for each signal line to transmit one of the first and second respective signals to the receiver;
- a first coupling circuit to capacitively-couple a representation of the first respective signal onto a first one of the at least four constituent signal lines which is to carry the second respective signal to the receiver; and
- a second coupling circuit to capacitively-couple a representation of the second respective signal onto a second one of the at least four constituent signal lines which is used to carry the first respective signal to the receiver;
- wherein each of the first coupling circuit and the second coupling circuit comprises a driver in series with a capacitor.

27. The transmitter of claim 26, where the parallel bus includes at least eight constituent signal lines.

28. The transmitter of claim 26, where each signal line of the at least four constituent signal lines comprises a differential pair.

29. The transmitter of claim 26, where each coupling circuit is to capacitively-couple a representation of each respective signal to at least one neighboring signal line among the at least four constituent signal lines.

30. A transmitter to convey signaling to a receiver over a micro-strip line bus that includes at least four constituent signal lines, the transmitter comprising:
- a driver for each signal line to transmit a signal to the receiver; and
- means for capacitively-coupling each signal to at least one neighboring line of the at least four constituent signal lines in a manner, such that a representation of first one of the signals is capacitively-coupled onto at least one neighboring line of the at least four constituent signal lines which is used to convey a second one of the signals, and such that a representation of the second one of the signals is capacitively-coupled onto at least one neighboring line of the at least four constituent signal lines which is used to convey the first one of the signals;
- wherein said means comprises a driver in series with a capacitor.

31. The transmitter of claim 30, where said means permits dynamic adjustment of the capacitive-coupling of each representation to at least one immediately adjacent signal line.

32. The transmitter of claim 30, further comprising means for calibrating at least one programmable value for the means for capacitively-coupling.

33. A method of operation in a signaling system that includes a transmitter circuit, a receiver circuit, and a parallel bus that includes at least four constituent signal lines that couple the transmitter circuit with the receiver circuit, the method comprising:

transmitting a signal over at least two of the constituent signal lines to the receiver circuit; and capacitively-coupling a representation each signal onto at least one neighboring signal line among the at least four constituent signal lines, in a manner such that a representation of a first signal is capacitively-coupled onto at least one neighboring line of the at least four constituent signal lines which is used to convey a second signal, and such that a representation of the second signal is capacitively-coupled onto at least one neighboring line of the at least four constituent signal lines which is used to convey the first signal;

where capacitive-coupling comprises using a driver in series with a capacitor to couple the representation of the respective signal.

34. The method of claim 33, further comprising dynamically adjusting capacitive-coupling provided for each representation to an adjacent neighbor signal line.

35. The method of claim 33, further comprising calibrating at least one programmable value for the capacitive-coupling.

36. The method of claim 33, further comprising calibrating drive strength for the capacitive-coupling of each signal to an adjacent signal line.

37. The method of claim 33, further comprising calibrating capacitance for the capacitive-coupling of each signal to an adjacent signal line.

\* \* \* \* \*